(12) United States Patent
Ogura et al.

(10) Patent No.: US 7,495,207 B2
(45) Date of Patent: Feb. 24, 2009

(54) OPTICAL SENSOR, OPTICAL TEMPERATURE-MEASURING DEVICE AND MEASURING METHOD USING THE OPTICAL SENSOR

(75) Inventors: Masaki Ogura, Hitschi (JP); Masahiko Kobayashi, Hitachi (JP); Akihiro Hiruta, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 64 days.

(21) Appl. No.: 11/483,981

(22) Filed: Jul. 11, 2006

(65) Prior Publication Data

US 2007/0145251 A1 Jun. 28, 2007

(30) Foreign Application Priority Data

Dec. 28, 2005 (JP) ............................. 2005-379100

(51) Int. Cl.
*H01J 40/00* (2006.01)
*G01J 1/04* (2006.01)
*G02B 6/00* (2006.01)
*H01S 3/00* (2006.01)

(52) U.S. Cl. .................... 250/227.14; 250/200; 385/13; 359/334

(58) Field of Classification Search ................. 250/200, 250/227.14, 227.15, 227.16, 227.28; 359/334, 359/341.1; 385/12, 13, 26, 125, 128, 135; 356/32, 35, 373; 73/705, 763, 774, 800
See application file for complete search history.

(56) References Cited

U.S. PATENT DOCUMENTS

| | | | | |
|---|---|---|---|---|
| 4,734,577 A | * | 3/1988 | Szuchy | 250/227.16 |
| 5,488,224 A | * | 1/1996 | Fagan et al. | 250/227.16 |
| 6,233,374 B1 | * | 5/2001 | Ogle et al. | 385/13 |
| 6,511,222 B1 | | 1/2003 | Bouamra | |
| 6,713,733 B2 | * | 3/2004 | Kochman et al. | 219/549 |
| 6,813,403 B2 | * | 11/2004 | Tennyson | 385/12 |
| 7,113,659 B2 | * | 9/2006 | Taverner | 385/12 |
| 7,228,022 B1 | * | 6/2007 | Bramson et al. | 385/14 |
| 2005/0105167 A1 | * | 5/2005 | Martinelli et al. | 359/334 |

FOREIGN PATENT DOCUMENTS

| | | |
|---|---|---|
| CN | 1400453 | 3/2003 |
| JP | 2784199 | 5/1998 |

OTHER PUBLICATIONS

Chinese Office Action dated May 16, 2008 with English Translation.

\* cited by examiner

*Primary Examiner*—Georgia Y Epps
*Assistant Examiner*—Don Williams
(74) *Attorney, Agent, or Firm*—McGinn IP Law Group, PLLC

(57) ABSTRACT

An optical sensor has: a sensing portion having an optical fiber to be disposed at a measurement point of temperature, distortion, pressure etc.; a light source to output a light to the sensing portion; and a photodetector to detect a backscattered light from the sensing portion. The sensing portion has a tape sheet and the optical fiber shaped into a corrugated form with a predetermined curvature. Alternatively, the sensing portion has a polymer optical waveguide with a core shaped into a corrugated form with a predetermined curvature.

18 Claims, 4 Drawing Sheets

11 OPTICL TEMPERATURE SENSOR BODY
12 SENSING PORTION (TAPE OPTICAL FIBER)
51 TEMPERATURE MEASUREMENT OBJECT

12 SENSING PORTION (TAPE OPTICAL FIBER)
61 CONNECTION OPTICAL FIBER
11 OPTICAL TEMPERATURE SENSOR BODY

OPTICAL SENSOR, OPTICAL TEMPERATURE-MEASURING DEVICE AND MEASURING METHOD USING THE OPTICAL SENSOR

The present application is based on Japanese patent application No. 2005-379100 filed on Dec. 28, 2005, the entire contents of which are incorporated herein by reference.

BACKGROUND OF THE INVENTION

1. Field of the Invention

This invention relates to an optical sensor, an optical temperature-measuring device and a measuring method using the optical sensor, which are capable of measuring temperature etc. by detecting Raman scattering light which is generated in an optical fiber etc.

2. Description of the Related Art

An optical sensor is known that measures temperature, distortion, and pressure, or detects breaking portion by using an optical fiber etc. Particularly, an optical temperature sensor using Raman scattering of the optical fiber is known.

FIG. 7 is a circuit diagram showing an optical temperature-measuring device 70 composed by connecting an electric circuit 72 to an optical temperature sensor 71.

As shown in FIG. 7, the optical temperature sensor 71 comprises a sensing portion with an optical fiber (=measurement long-distance optical fiber) 73 disposed at temperature measurement points, a light source (=light-emitting device) 75 to output a light signal to the optical fiber 73, and two photodetectors (=light-receiving devices) 76, 77 to receive a backscattered light from the optical fiber 73. The light source 75 and the light-receiving devices 76, 77 are connected with the one optical fiber 73 through a wavelength filter 74.

The light source 75 and the two light-receiving devices 76, 77 are connected electrically with an electric circuit 72 respectively. For example, received signal amplifiers 78, 78 to amplify a signal from the light-receiving devices 76, 77 are connected with the light-receiving device 76 and 77 respectively, analog-digital converters 79, 79 (A/D converters) are each connected with the received signal amplifiers 78, 78 respectively, and the both A/D converters 79, 79 are connected with a signal processing circuit 80. Further, the light source 75 is connected with the signal processing circuit 80 through a light-emitting device drive circuit 81.

The optical fiber 73 is a multimode fiber or a single-mode fiber etc. for general communication, and its core is doped with Ge.

When light of the light-emitting device 75 such as a laser diode is inputted to the optical fiber 73, a slight Raman scattering light is generated in each point of the optical fiber 73. As shown in FIG. 8, the Raman scattering light is generated at wavelength bands on both sides of incident wavelength $\lambda 0$. The Raman scattering light on the longer-wavelength side is called Stokes light $\lambda St$ and the Raman scattering light on the shorter-wavelength side is called anti-Stokes light $\lambda As$. The strength ratio of the Stokes light and the anti-Stokes light generated in the optical fiber 73 depends on the temperature of the optical fiber 73. Thus, when the temperature of the optical fiber 73 is changed depending on the temperature of a temperature measurement object, the strength ratio of the detected Stokes light and anti-Stokes light is changed. Therefore, the temperature of the temperature measurement object can be measured by detecting the strength ratio.

In the optical temperature-measuring device 70, backscattered Stokes light and anti-Stokes light are separated by the wavelength filter 74, and are received by light-received device 76 and 77, respectively. The received light is converted into an electric signal, and the electric signal is amplified by the received signal amplifier 78. The amplified electric signal is converted into a digital signal by the A/D converter 79, and is inputted to the signal processing circuit 80. In the signal processing circuit 80, temperature is determined from the input electric signal, and its thermal signal is displayed.

In general, since the Raman scattering light is very weak in its strength, the electric signal converted by the light-receiving devices 76, 77 has a low S/N ratio. Therefore, in order to improve the S/N ratio and the measurement accuracy of temperature, the Raman scattering light is detected many times and the electric signals detected are averaged.

The related art of the invention is, e.g., JP-A-2784199, which discloses an optical temperature sensor using Raman scattering light.

In the optical temperature sensor 71 in FIG. 7, pulsed light is inputted to the optical fiber 73 and the Raman scattering light generated by the pulsed light is detected. In the optical temperature sensor 71 using the pulsed light, axial resolution is determined by the pulse width of the pulsed light or the sampling frequency when converting the received signal.

In the system to receive the Raman scattering light, the axial resolution $\Delta x$ [m] in the temperature measurement is given by the following formula:

$$\Delta x = cW/2n,$$

where the pulse width is W [s], the light speed is c [m/s] and the refractive index of the optical fiber is n.

Thus, provided that $c=3\times10^8$ [m/s] and n=1.5, the pulsed light of 10 ns in pulse width must be inputted into the optical fiber to obtain an axial resolution of 1 m. Further, the pulsed light of 1 ns in pulse width must be inputted thereinto to obtain an axial resolution of 0.1 m.

Further, the axial resolution $\Delta x$ [m] determined by the sampling frequency is given by the following formula:

$$\Delta x = c/2nfs,$$

where the sampling frequency is fs [Hz].

Thus, provided that $c=3\times10^8$ [m/s], n=1.5 and fs=100 [MHz], the axial resolution $\Delta x$ becomes 1 m. Further, the sampling frequency must be fs=1 [GHz] to obtain an axial resolution of 0.1 m.

Accordingly, the sampling frequency must be at least 1 [GHz] or more to adjust the axial resolution of the optical temperature sensor to be 0.1 m or less, so that a high-speed operation circuit with a pulse width of 1 ns or less in pulsed is required. However, such a circuit is difficult to provide at a low cost based on the present technology level.

SUMMARY OF THE INVENTION

Accordingly, it is an object of the invention to provide an optical sensor, an optical temperature-measuring device and a measuring method using the optical sensor that are capable of enhancing the axial resolution of the temperature measurement at a low cost without increasing the sampling frequency or narrowing the pulse width.

(1) According to one aspect of the invention, an optical sensor comprises:

a sensing portion comprising an optical fiber to be disposed at a measurement point of temperature, distortion, pressure etc.;

a light source to output a light to the sensing portion; and a photodetector to detect a backscattered light from the sensing portion, wherein the sensing portion comprises a tape sheet and the optical fiber shaped into a corrugated form with a predetermined curvature.

In the above invention (1), the following modifications and changes can be made.

(i) The optical fiber comprises a holey fiber.

(ii) The tape sheet comprises flexibility.

(2) According to another aspect of the invention, an optical sensor comprises:

a sensing portion comprising an optical waveguide to be disposed at a measurement point of temperature, distortion, pressure etc.;

a light source to output a light to the sensing portion; and a photodetector to detect a backscattered light from the sensing portion, wherein the sensing portion comprises a polymer optical waveguide, and the polymer optical waveguide comprises a core shaped into a corrugated form with a predetermined curvature.

In the above invention (1) or (2), the following modifications and changes can be made.

(iii) A plurality of the sensing portions are connected through a connection optical fiber.

(3) According to another aspect of the invention, an optical temperature-measuring device comprises:

a sensing portion comprising an optical fiber to be disposed at a measurement points of temperature;

a light source to output a light to that sensing portion;

a photodetector to detect a Raman scattering light from the sensing portion; and an electric circuit that is connected to the light source and the detector to process electrically the Raman scattering light and to display a temperature signal, wherein the sensing portion comprises a tape sheet and the optical fiber shaped in a corrugated form with a predetermined curvature.

(4) According to another aspect of the invention, an optical temperature-measuring device comprises:

a sensing portion comprising an optical fiber to be disposed at a measurement points of temperature;

a light source to output a light to that sensing portion;

a photodetector to detect a Raman scattering light from the sensing portion; and an electric circuit that is connected to the light source and the detector to process electrically the Raman scattering light and to display a temperature signal, wherein the sensing portion comprises a polymer optical waveguide, and the polymer optical waveguide comprises a core shaped into a corrugated form with a predetermined curvature.

(5) According to another aspect of the invention, a method of measuring a physical quantity change of a measured object comprises the steps of:

disposing a sensing portion comprising a long optical fiber near the measured object;

sending a light into the sensing portion; and detecting a backscattered light generated from the sensing portion;

wherein the physical quantity change of the measured object is measured by using an optical sensor comprising the sensing portion that comprises a tape sheet and the optical fiber shaped in a corrugated form with a predetermined curvature, and the sensing portion is wound in a spiral form around the measured object.

(6) According to another aspect of the invention, a method of measuring a physical quantity change of a measured object comprises the steps of:

disposing a sensing portion comprising a long optical fiber near the measured object;

sending a light into the sensing portion; and detecting a backscattered light generated from the sensing portion;

wherein the physical quantity change of the measured object is measured by using an optical sensor comprising the sensing portion that comprises a polymer optical waveguide comprising a core shaped into a corrugated form with a predetermined curvature, and the sensing portion is wound in a spiral form around the measured object.

<Advantages of the Invention>

According to the invention, an excellent effect can be obtained such that the axial resolution in measuring the temperature, distortion, pressure etc. or detecting the breaking portion at a low cost is enhanced without increasing the sampling frequency or narrowing the pulse width.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Preferred embodiment according to this invention will be explained in more detailed in conjunction with the appended drawings.

Although the invention relates to an optical sensor to measure temperature, distortion, and pressure or to detect the breaking portion of long cables etc., in this embodiment, an optical temperature sensor to measure temperature will be described below.

Figure 1:
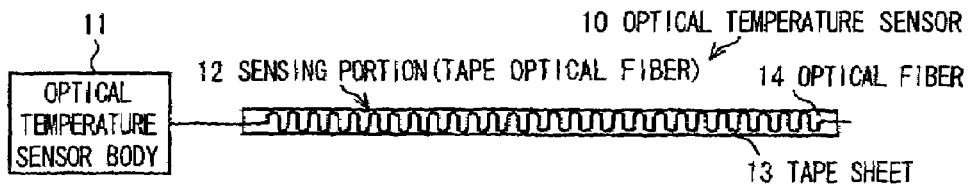
FIG. 1 is a plan view showing the optical sensor in a preferred embodiment according to the invention.

FIG. 1 is a plan view of the optical temperature sensor in the preferred embodiment according to the invention.

The optical temperature sensor 10 comprises a temperature sensor body 11 and a sensing portion 12 with an optical fiber 14 disposed at a measurement point for temperature. The temperature sensor body 11 comprises mainly a light source to output a light to the sensing portion 12 and a photodetector to detect a Raman scattering light from the sensing portion 12. However, the connection among the light source, the photodetector and the optical fiber 14 is made similarly to the optical temperature sensor 71 in FIG. 7 described earlier.

The optical temperature sensor 10 of the embodiment has a feature that the sensing portion 12 is constructed such that the optical fiber 14 is disposed in a corrugated form with a predetermined curvature on a tape sheet 13. In detail, the sensing portion 12 comprises a tape optical fiber that the optical fiber 14 is buried in the tape sheet 13 while being shaped in a corrugated form in the tape sheet 13.

The optical fiber 14 can be a holey fiber with a plurality of holes extending in the longitudinal direction of the fiber, or a solid optical fiber such as a single-mode optical fiber (SMF), a multi-mode optic fiber (MMF) etc.

It is preferable that the tape sheet 13 is formed by using silicone resin or polymer material with flexibility. Alternatively, the tape sheet 13 can be formed by using hard materials.

Figure 2:
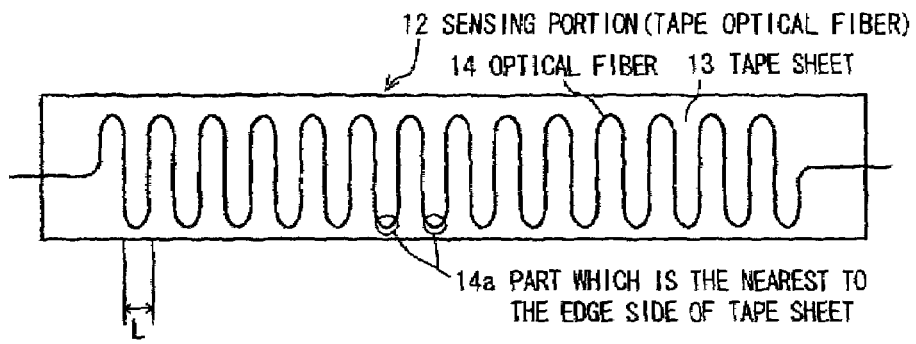
FIG. 2 is an enlarged view of a sensing portion in FIG. 1.

As shown in FIG. 2, it is preferable that the sensing portion (=tape optical fiber) 12 comprises the optical fiber 14 shaped in a corrugated form and with a predetermined cycle. The corrugation of the optical fiber 14 is formed with a sin wave or zigzag shape (or meandering), and a part 14$a$ thereof nearest to the edge side of the tape sheet 13 is bent at the minimum curvature.

In this embodiment, a holey fiber is used as the optical fiber 14, and its minimum bend diameter L is set to be 10 mm and its length s per one cycle of the corrugation formed in the optical fiber 14 is set to be 100 mm. The corrugation of formed in the optical fiber 14 is zigzag, and the minimum bend diameter L is set to be half a length of the tape sheet 13 corresponding to one cycle of the optical fiber.

Next, the manufacturing method of the tape optical fiber 12 will be explained.

Figure 3:
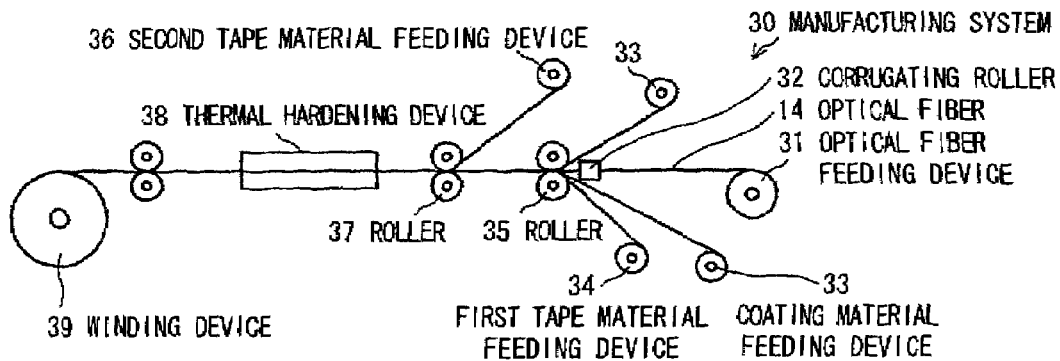
FIG. 3 is a schematic side view showing a manufacturing system of the sensing portion in FIG. 2.
Figure 4:
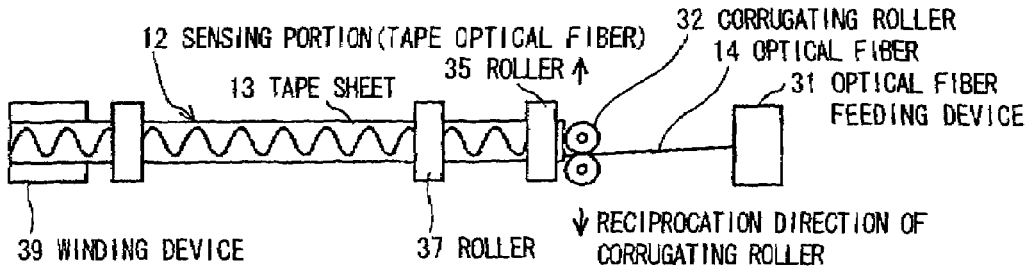
FIG. 4 is a schematic top view showing the manufacturing system of the sensing portion in FIG. 2.

FIG. 3 is a side view showing the manufacturing method of the tape optical fiber 12, and FIG. 4 is a top view showing the manufacturing system of the tape optical fiber 12.

As shown in FIG. 3 and FIG. 4, the manufacturing system 30 comprises: an optical fiber feeding device 31 to feed the optical fiber 14; a corrugating roller 32 to shape the optical fiber 14 in a corrugated form; a coating material feeding device 33 to feed a coating material for covering the optical fiber 14; a first tape material feeding device 34 to feed the tape material for forming one side of the tape sheet; a second tape material feeding device 36 to feed the tape material for forming another side of the tape sheet; rollers 35, 37 to integrate the fed materials; a thermal hardening device 38 to thermally harden the coating material and the tape material; and a winding device 39 to reel the shaped tape optical fiber 12.

The optical fiber 14 is fed from the optical fiber feeding device 31 to the corrugating roller 32. Since the corrugating roller 32 is reciprocated substantially in the vertical direction relative to the optical fiber feeding direction, the fed optical fiber 14 can be shaped into the corrugated form and is fed to the roller 35. In the roller 35, the optical fiber 14 is covered with the coating material fed from the coating material feeding devices 33 and 33, and the tape material fed from the first tape material feeding device 34 is spread on one side of the corrugated shape formed in the optical fiber 14. In the roller 37, the tape material fed from the second tape material feeding device 36 is spread on the other side of the corrugated shape formed in the optical fiber 14, so that the optical fiber 14 is on both sides thereof covered with the tape material. Then, the tape material covering the optical fiber 14 is hardened by the thermal hardening device 38 and shaped into the tape sheet 13. The tape optical fiber 12 with the tape sheet 13 thus shaped is reeled by the winding device 39.

Figure 7:
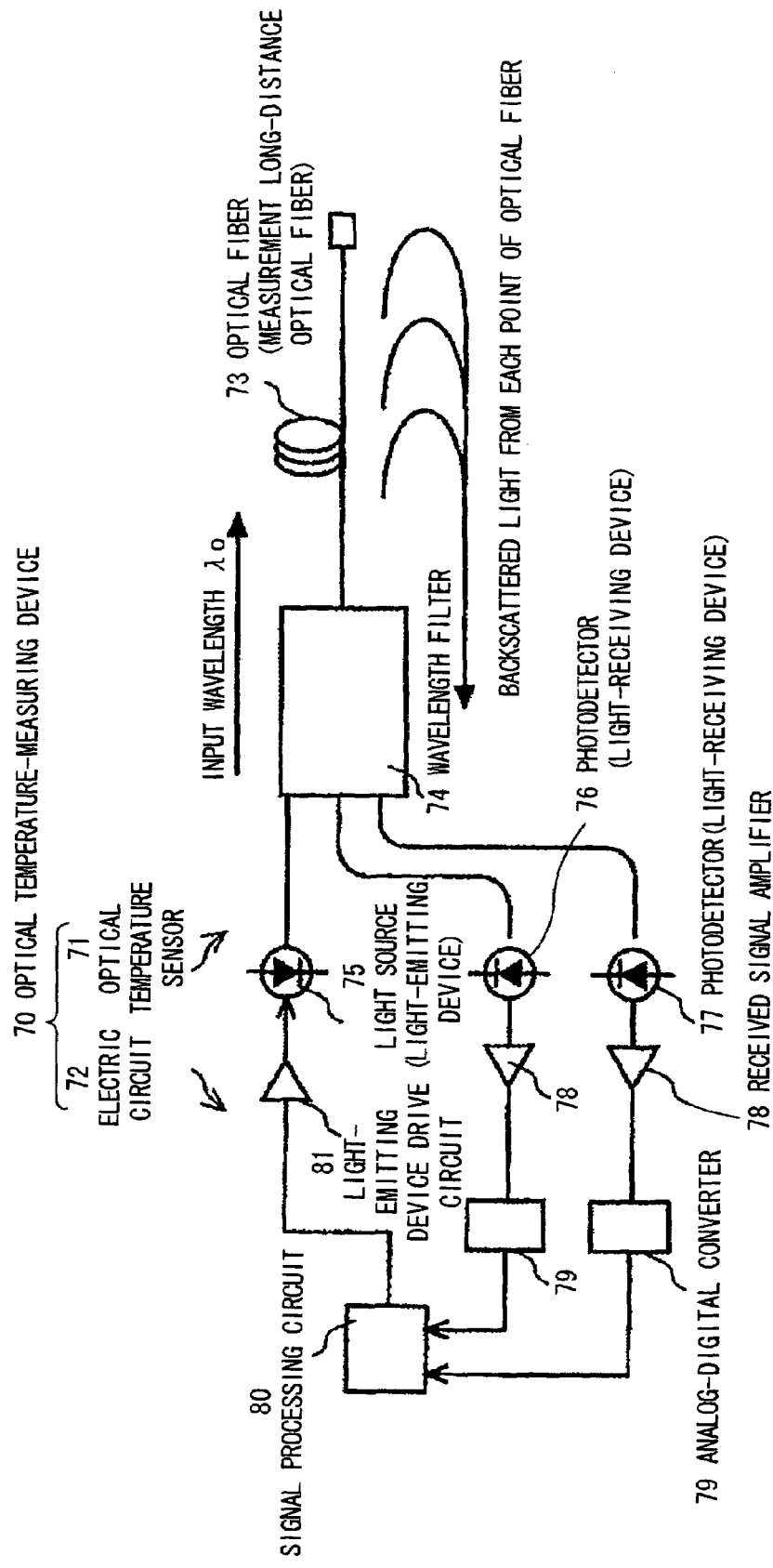
FIG. 7 is a circuit diagram showing an optical temperature detecting device.
Figure 8:
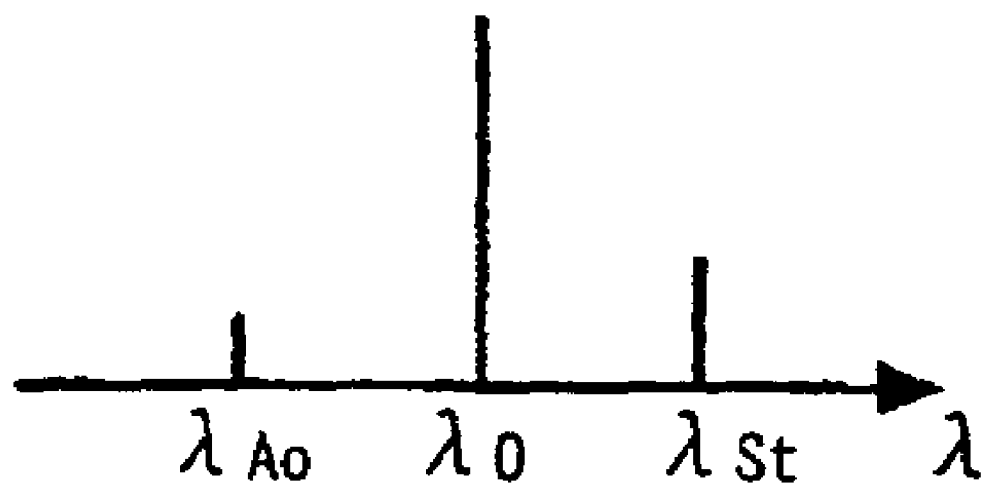
FIG. 8 is a diagram showing a wavelength characteristic of Raman scattering light.

The optical temperature sensor 10 sends light from the light source in the temperature sensor body 11 to the tape optical fiber 12 placed at the temperature measurement object, detects the light intensity (i.e., strength ratio of the Stokes light and the anti-Stokes light) of backscattered light generated in the optical fiber 14 by the photodetector in the temperature sensor body 11, and determines the temperature of the temperature measurement object from the light intensity (See FIG. 7 for details).

The axial resolution of the optical temperature sensor 10 of this embodiment will be explained below.

Provided that the minimum bend diameter (i.e., about half a length of the tape sheet corresponding to one cycle of the optical fiber in the tape optical fiber 12) is L, the length of the optical fiber per half cycle is s, and the axial resolution of the optical sensor is $\Delta s$, the axial resolution $\Delta L$ obtained by the optical fiber disposed in the corrugated form is expressed by the following formula:

$$\Delta L = \Delta s \cdot L/s$$

The relationship between the minimum bend diameter L of the optical fiber 14 and the axial resolution $\Delta L$ of the optical sensor 10 is as shown in Table 1.

TABLE 1

|  | Minimum bend diameter (L) | Length of the optical fiber per half cycle (s) | Axial resolution of the optical sensor ($\Delta s$) | Axial resolution ($\Delta L$) obtained by the optical fiber disposed in the corrugated form |
|---|---|---|---|---|
| Holey fiber | 10 mm | 100 mm | 1000 mm | 100 mm |
| SMF | 30 mm | 100 mm | 1000 mm | 300 mm |

As shown in Table 1, for example in case of the holey fiber, provided that $\Delta s=1$ [m], s=0.1 [m], and L=0.01 [m], it becomes $\Delta L=0.1$ [m]. Therefore, the axial resolution of the optical temperature sensor 10 is $\frac{1}{10}$ as compared to that (1 m) of the optical temperature sensor with the optical fiber disposed linearly. Thus, the substantial axial resolution can be enhanced by the optical fiber 14 disposed in the corrugated form. Thus, the optical temperature sensor 10 of this embodiment can enhance the axial resolution by reducing the length in the longitudinal direction of the temperature measurement object (i.e., the sensing portion 12) relative to the length of the optical fiber 14, without increasing the sampling frequency when converting the detected backscattered light electrically or narrowing the pulse width of pulsed light to be inputted into the optical fiber 14.

Further, in this embodiment, a holey fiber is used as the optical fiber 14. The minimum bend diameter L of the holey fiber is smaller than the solid optical fiber (e.g., single-mode fiber (=SMF)). For example, provided that the minimum bend diameter of the holey fiber is 10 mm and the minimum bend diameter of SMF is 30 mm, the axial resolution $\Delta L$ of the optical sensor 10 becomes 100 mm for the holey fiber and 300 mm for SMF, so that the axial resolution $\Delta L$ can be enhanced to $\frac{1}{3}$ by using the holey fiber as shown in Table 1.

Further, although a general optical fiber has an increased loss as the curvature of the bending portion in the corrugation is increased, the holey fiber can have a low loss and an improved axial resolution since the holey fiber has a lower loss even when it is bent strongly.

Since the tape sheet 13 has a wide width and flexibility, it is easy to dispose at or to fix to the temperature measurement object. Therefore, it is especially effective to measure the temperature distribution of a long temperature measurement object such as a power cable, a steam piping etc. and a large-scale object.

Figure 5:
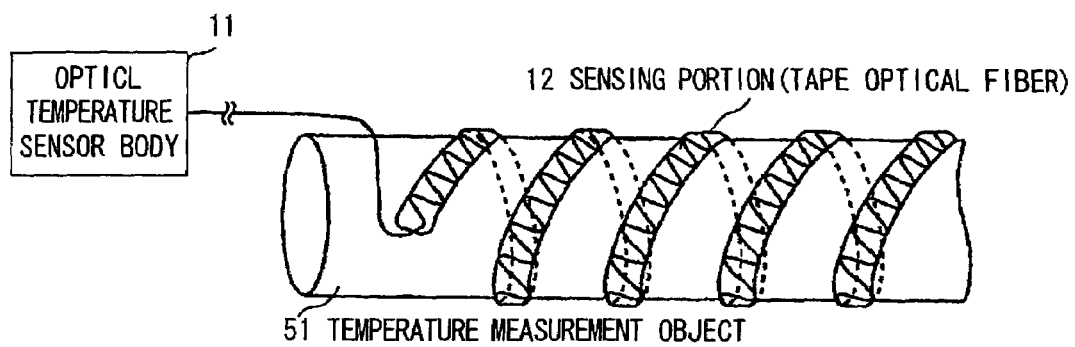
FIG. 5 is a perspective view showing that the sensing portion in FIG. 2 is rolled around the temperature measurement object.

FIG. 5 is a diagram showing an applying example of the optical temperature sensor 10. As shown in FIG. 5, for instance, the tape optical fiber 12 is wound in a spiral form around a long cylindrical temperature measurement object 51. Since the optical fiber 14 is shaped in the corrugated form in the tape sheet 13 as described in FIG. 2 and the tape optical fiber 12 is wound in the spiral form around the temperature measurement object 51, distance in the longitudinal direction of the cylinder relative to the length of the optical fiber 14 becomes shorter and the axial resolution can be further enhanced.

Further, the way of winding the tape optical fiber 12 is not limited to the spiral form, but after lap winding several times, lap winding can be repeated several times again while slightly sliding the winding part. In this case, the axial resolution of the temperature measurement can be further enhanced.

Figure 6:
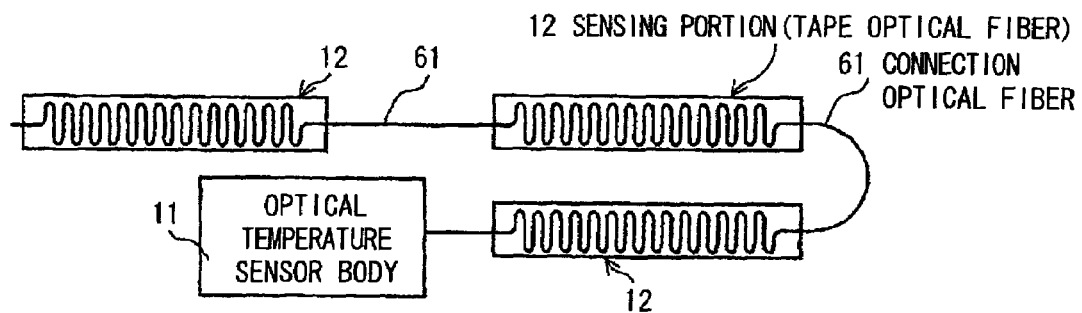
FIG. 6 is a plan showing a modification of the optical temperature sensor of the embodiment.

Although, in the optical sensor 10 in FIG. 1, the sensing portion 12 is formed by shaping the optical fiber 14 in the corrugated form in one tape sheet 13, a plurality of the sensing portions 12 can be connected (in tandem) through a connection optical fiber 61 as shown in FIG. 6. By using a plurality of the sensing portion 12, 12, 12 connected in tandem, parts requiring a high axial resolution can be measured all at once in relation to a plurality of temperature measurement objects distant from each other.

Although, in the optical temperature sensor 10 of this embodiment, the optical tape fiber 12 is fabricated by burying the optical fiber 14 in the tape sheet 13, the tape optical fiber 12 can be fabricated by fixing the optical fiber 14 shaped in the corrugated form on the surface of the tape sheet 13.

In the optical temperature sensor 10 of this embodiment, the temperature sensor body 11 comprises at least the light source 75, the photodetectors 76 and 77 shown in FIG. 7. However, the invention may include an optical temperature-measuring device that the electric circuit 72 is connected with the light source 75, the photodetectors 76 and 77 of the temperature sensor body 11.

An optical sensor in another embodiment according to the invention will be explained below.

Although the sensing portion 12 is fabricated by disposing the optical fiber 14 in the tape sheet 13 in the optical temperature sensor 10 in FIG. 1, the optical temperature sensor of this embodiment differs from the optical temperature sensor 10 in FIG. 1 in that the sensing portion is formed with a polymer optical waveguide and a core of the polymer optical waveguide is shaped in a corrugated form with a predetermined curvature.

In the polymer optical waveguide, the optical waveguide composed of the core and a clad each made of a polymer material is formed on a substrate. The polymer optical waveguide is composed integrating in a plane form a waveguide (=core) to transmit light, the substrate with flexibility and a cladding material (=clad), and has flexibility as the whole optical waveguide.

In the optical temperature sensor of this embodiment, as compared to the optical temperature sensor 10 in FIG. 1, the core corresponds to the optical fiber 14, the clad and the substrate correspond to the tape sheet 13, and the polymer optical waveguide corresponds to the tape optical fiber 12.

The optical sensor of this embodiment also has the same effect as the optical sensor in FIG. 1.

Further, in the polymer waveguide, since the waveguide (=core) pattern is formed on the substrate (and the clad) by using the mask, the corrugated pattern can be easy formed at a high accuracy, as compared to the tape optical fiber 12 of the optical temperature sensor in FIG. 1.

In the polymer waveguide, since the core and the clad are formed with the same material system (strictly, each material is different since the refractive index is different therebetween), the number of the parts which compose the sensing portion can be reduced and the implementation becomes easy and the manufacturing cost can be reduced.

The optical fiber or optical waveguide can be applied to a distortion measurement, a pressure measurement etc. other than the temperature measurement. The temperature measurement can be rendered by detecting the Raman scattering light as the backscattered light. Further, the measurement of distortion, pressure etc. can be rendered by detecting Brillouin scattering light as the backscattered light.

Further, the invention can be applied to the measurement of disconnecting position in the optical fiber to detect Rayleigh scattering light generated by the disconnection of the optical fiber.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical sensor, comprising:
a sensing portion comprising an optical fiber comprising a holey fiber to be disposed at a measurement point of at least one of temperature, distortion, and pressure;
a light source to output a light to the sensing portion; and
a photodetector to detect a backscattered light from the sensing portion,
wherein the sensing portion comprises a tape sheet and the optical fiber shaped into a corrugated form with a curvature of a bend diameter greater than 10 mm.

2. The optical sensor according to claim 1, wherein:
the tape sheet comprises flexibility.

3. The optical sensor according to claim 1, wherein:
a plurality of the sensing portions are connected through a connection optical fiber.

4. The optical sensor according to claim 1, wherein the optical fiber is buried in the tape sheet while being shaped in the corrugated form in the tape sheet.

5. The optical sensor according to claim 1, wherein the holey fiber comprises a plurality of holes extending in a longitudinal direction of the holey fiber.

6. The optical sensor according to claim 1, wherein the optical fiber has a predetermined cycle.

7. The optical sensor according to claim 1, wherein the optical fiber has a predetermined cycle, and
a minimum bend diameter of the holey fiber is one-half of a length of the tape sheet corresponding to one predetermined cycle of the optical fiber.

8. The optical sensor according to claim 1, wherein the optical fiber has the corrugated form before a pressure is applied.

9. The optical sensor according to claim 1, further comprising a sensor body comprising said light source and said photodetector.

10. The optical sensor according to claim 1, wherein said tape sheet comprises at least one of silicone resin and polymer material.

11. The optical sensor according to claim 1, wherein said corrugated form comprises one of a sine wave and a zigzag.

12. The optical sensor according to claim 1, wherein the optical fiber has a predetermined cycle, and
wherein a length of said predetermined cycle is 100 mm.

13. The optical sensor according to claim 1, wherein said sensing portion is connected to a plurality of sensing portions by a connection optical fiber.

14. An optical temperature-measuring device, comprising:
- a sensing portion comprising an optical fiber comprising a holey fiber to be disposed at a measurement point of temperature;
- a light source to output a light to that sensing portion;
- a photodetector to detect a Raman scattering light from the sensing portion; and
- an electric circuit that is connected to the light source and the detector to process electrically the Raman scattering light and to display a temperature signal,
- wherein the sensing portion comprises a tape sheet and the optical fiber shaped in a corrugated form with a curvature of a bend diameter greater than 10 mm.

15. The optical temperature measuring device according to claim 14, wherein the optical fiber is fixed in a shape of the corrugated form on a surface of the tape sheet.

16. An optical temperature-measuring device, comprising:
- a sensing portion comprising an optical fiber comprising a holey fiber to be disposed at a measurement point of temperature;
- a light source to output a light to that sensing portion;
- a photodetector to detect a Raman scattering light from the sensing portion; and
- an electric circuit that is connected to the light source and the detector to process electrically the Raman scattering light and to display a temperature signal,
- wherein the sensing portion comprises a polymer optical waveguide, and
- wherein the polymer optical waveguide comprises a core shaped into a corrugated form with a predetermined curvature of a bend diameter greater than 10 mm.

17. A method of measuring a physical quantity change of a measured object, comprising:
- disposing a sensing portion comprising a long optical fiber comprising a holey fiber near the measured object;
- sending a light into the sensing portion; and
- detecting a backscattered light generated from the sensing portion,
- wherein the physical quantity change of the measured object is measured by using an optical sensor comprising the sensing portion that comprises a tape sheet and the optical fiber shaped in a corrugated form with a curvature of a bend diameter greater than 10 mm, and
- wherein the sensing portion is wound in a spiral form around the measured object.

18. A method of measuring a physical quantity change of a measured object, comprising:
- disposing a sensing portion comprising a long optical fiber near the measured object;
- sending a light into the sensing portion; and
- detecting a backscattered light generated from the sensing portion,
- wherein the physical quantity change of the measured object is measured by using an optical sensor comprising the sensing portion that comprises a polymer optical waveguide comprising a core shaped into a corrugated form with a curvature of a bend diameter greater than 10 mm, and
- wherein the sensing portion is wound in a spiral form around the measured object.

* * * * *

UNITED STATES PATENT AND TRADEMARK OFFICE
CERTIFICATE OF CORRECTION

PATENT NO. : 7,495,207 B2  Page 1 of 1
APPLICATION NO. : 11/483981
DATED : February 24, 2009
INVENTOR(S) : Ogura et al.

It is certified that error appears in the above-identified patent and that said Letters Patent is hereby corrected as shown below:

Title Page; should read;
(75)   Inventors:   Masaki Ogura, Hitachi (JP); Masahiko Kobayashi, Hitachi (JP); Akihiro Hiruta, Hitachi (JP)

Signed and Sealed this

Thirtieth Day of June, 2009

JOHN DOLL
*Acting Director of the United States Patent and Trademark Office*